United States Patent [19]

Vandling

[11] 4,044,383
[45] Aug. 23, 1977

[54] METHOD AND APPARATUS FOR SYNCHRONIZING FACSIMILE TRANSCEIVERS

[75] Inventor: John M. Vandling, Pleasantville, N.Y.

[73] Assignee: Exxon Research and Engineering Company, Linden, N.J.

[21] Appl. No.: 676,369

[22] Filed: Apr. 12, 1976

Related U.S. Application Data

[63] Continuation of Ser. No. 493,119, July 30, 1974, abandoned.

[51] Int. Cl.² .................. H04N 1/36; G01D 15/34
[52] U.S. Cl. ............................ 358/264; 358/274; 318/314; 346/138
[58] Field of Search ............. 358/264, 274–279; 318/314, 318, 329; 346/138

[56] References Cited

U.S. PATENT DOCUMENTS

| | | | |
|---|---|---|---|
| 3,355,649 | 11/1967 | Boylan et al. | 318/314 |
| 3,441,665 | 4/1969 | Wuensch | 358/264 |
| 3,582,550 | 6/1971 | Latanzi et al. | 358/264 |
| 3,614,319 | 10/1971 | Krallinger et al. | 358/264 |
| 3,622,703 | 11/1971 | Ricketts, Jr. et al. | 358/264 |
| 3,761,610 | 9/1973 | Krallinger et al. | 358/264 |

Primary Examiner—Malcolm A. Morrison
Assistant Examiner—Errol A. Krass
Attorney, Agent, or Firm—N. Norris

[57] ABSTRACT

In a facsimile system, rotation of a transmitter drum carrying a document is synchronized with the rotation of a receiver drum carrying a copy medium. Synchronization is achieved by rotating the transmitter drum at a substantially constant angular frequency while generating transmitter synchronizing pulses corresponding to that frequency and rotating the receiver drum at an initial angular frequency while generating receiver synchronizing pulses corresponding to the initial frequency where the initial frequency of the receiver drum differs substantially from the constant frequency of the transmitter drum. When partial coincidence between portions of a transmitter synchronizing pulse and the receiver drum synchronizing pulse is detected, the receiver drum is rotated at another frequency closer to the constant frequency of the transmitter drum. When a reversal in the lead-lag relationship between the transmitter synchronizing pulse and the receiver drum synchronizing pulse corresponding to substantial coincidence between the synchronizing pulses is detected, the receiver drum is driven at the constant angular frequency of the transmitter drum.

42 Claims, 3 Drawing Figures

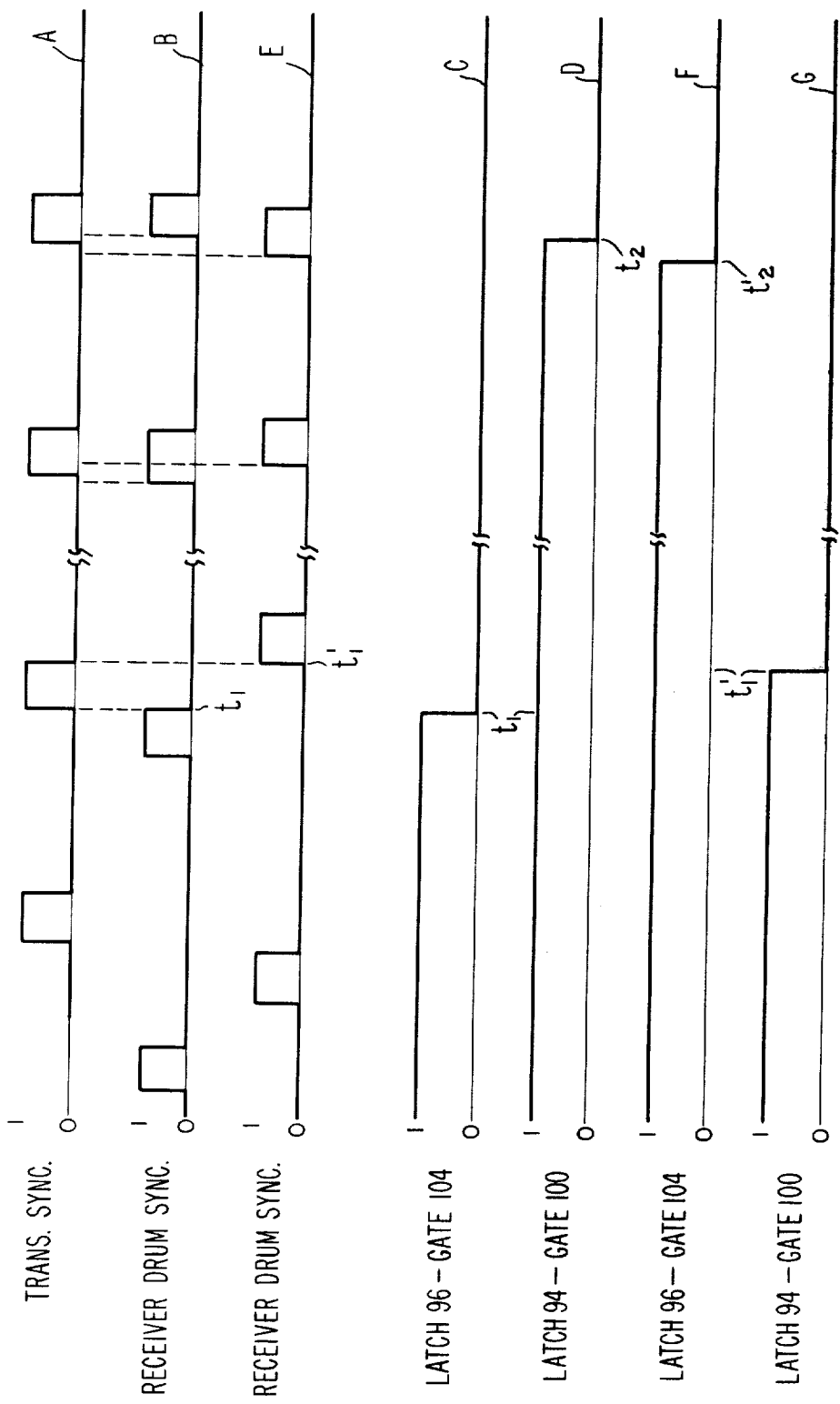

METHOD AND APPARATUS FOR SYNCHRONIZING FACSIMILE TRANSCEIVERS

This is a continuation of application Ser. No. 493,119, filed July 30, 1974 and now abandoned.

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing dark-light variations in the document being scanned. These information-bearing signals are transmitted over the communications network to a facsimile receiver where the information-bearing signals are converted to marks or images on a copy medium so as to form a copy which is a facsimile of the original document.

Typically, the document at the transmitter circumscribes a rotatably mounted transmitter drum and the copy medium at the receiver similarly circumscribes a rotatably mounted receiver drum. The transmitter drum and the receiver drum are then driven at substantially the same angular frequency so that the area of the document scanned by the optical pickup means equals the overall area of the copy medium traversed by a writing mechanism such as a stylus in a given period of time. However, driving the transmitter drum and the receiver drum at the same angular frequency does not assure that the edge of the document will necessarily correspond with the edge of the copy since the initial position of the optical pickup means with respect to the edge of the document is not necessarily the same as the initial position of the writing mechanism with respect to the edge of the copy medium.

In copending application Ser.No. 333,616 filed Feb. 20, 1973, assigned to the assignee of this invention, the positioning of the edge of the document relative to the optical pickup means and the edge of the copy medium relative to the writing mechanism is not required since the copy medium comprises a continuous loop of material. After a facsimile transmission, the edge of the copy medium may be appropriately located by cutting the closed loop of the copy medium at the proper location. Where a continuous loop of the copy medium is not utilized, it is necessary to synchronize the edge of the document relative to the optical pickup means and the edge of the copy medium relative to the writing mechanism before transmitting the information content of the document at the transmitter to the receiver.

Once transmission of the information content begins, it is necessary to rotate the receiver drum and the transmitter drum at virtually identical frequencies so as to avoid margin skew. Even very slight variations in the frequency of angular drum rotation may result in substantial skewing. For example, variation in frequency at the transmitter of one part in 50,000 combined with a variation in frequency at the receiver of one part in 50,000 will result, assuming the errors are additive, in a combined error of one part in 25,000. This error, assuming it continues throughout the facsimile transmission, will produce a skewing of the copy margin equal to ⅛ths of an inch over the 11 inch length of a document when the drum speed is 180 R.P.M. and the lateral scan rate is 1.8 inches per minute. Such deviations are not at all uncommon where the drum speeds are synchronized with power line frequency and transmitter and receiver are on different power grids. Where the deviations in frequency between the transmitter and receiver do not continue throughout the transmission, e.g., just a matter of seconds, the imperfections in the copy quality are less significant although unsatisfactory imperfections may result where deviations occur for periods of ten seconds or less.

U.S. Pat. No. 3,582,550 - Latanzi discloses a facsimile receiver having a synchronization circuitry for achieving synchronization of the margins on the document and copy medium. The system includes a stable frequency oscillator having an output connected to a frequency generator comprising a number of series-connected flip-flops forming a binary counter. The output of the oscillator is also connected to a clock which determines the elapsed time between transmitter synchronizing pulses and receiver synchronizing pulses. A decoder which is responsive to the period between the synchronizing pulses as determined by the clock selectively adds or deletes pulses in the binary counter so as to alter the frequency of the drive on the receiver drum to secure margin synchronization between the copy medium at the receiver and the document at the transmitter.

In the system of U.S. Pat. No. 3,622,703 - Ricketts, Jr., et al, synchronization of the document and copy medium edges or margins is achieved by driving the receiver drum at a frequency different from the frequency of the transmitter drum. The frequency differential is provided by a voltage controlled oscillator in the receiver. In one system disclosed in the Ricketts, Jr., et al patent, the voltage controlled oscillator is under the control of an error signal generated by a phase detector responsive to the transmitter and receiver synchronizing pulses. When the transmitter and receiver synchronizing pulses achieve a predetermined degree of coincidence, the first-mentioned phase detector becomes inoperative and control of the oscillator is assumed by a phase detector which compares the frequency of the voltage controlled oscillator with that of a fixed frequency crystal oscillator

SUMMARY OF THE INVENTION

It is an object of this invention to provide an improved method and apparatus for synchronizing the margins of a document and copy prior to a facsimile transmission.

In accordance with this and other objects, sychronization of a facsimile system is achieved where the system comprises a receiver including writing means juxtaposed to a copy medium and receiver scanning means for creating a relative scanning motion between the writing means and the copy medium. The transmitter includes information sensing means juxtaposed to a document and transmitter scanning means for creating a relative scanning motion between the sensing means and the document. A communications link carries signals between the transmitter and the receiver.

In achieving synchronization, a relative scanning motion is created at the receiver at a first scanning rate and a relative scanning motion is created at the transmitter at a second scanning rate where the first scanning rate and the second scanning rate have a substantial scanning rate differential. A first synchronizing signal corresponding to a predetermined position of the writing means and the copy medium is generated and a second synchronizing signal corresponding to a predetermined position of the reading means with respect to the document is also generated. A first degree of coincidence is detected between the first synchronizing signal and at least a portion of the second synchronizing signal whereupon the differential between the first scanning rate and the second scanning rate is reduced. Subsequently, a more substantial degree of coincidence in time is detected and the scanning rate differential is substantially eliminated.

In accordance with one important aspect of the invention, the relative lead-lag relationship between the first synchronizing signal and the second synchronizing signal is detected. The differential between the first and second scanning rates is then controlled in response to the lead-lag detection such that the first scanning rate is larger than the second scanning rate in response to one lead-lag relationship and the second scanning rate is larger than the first scanning rate in response to the opposite lead-lag relationship.

In accordance with another aspect of the invention, the more substantial degree of coincidence detection may comprise the detection of a reversal of the lead-lag relationship between one edge of the first synchronizing signal and one edge of the second synchronizing signal.

In accordance with a still further aspect of the invention, the substantial scanning rate differential preferably exceeds 5% of the first scanning rate and the reduced scanning rate differential preferably is less than 1% of the first scanning rate.

BRIEF DESCRIPTION OF THE DRAWINGS

FIG. 3 is a waveform diagram illustrating synchronizing pulses and other waveforms generated by the circuit of FIG. 1.

DETAILED DESCRIPTION OF A PREFERRED EMBODIMENT

Figure 1:
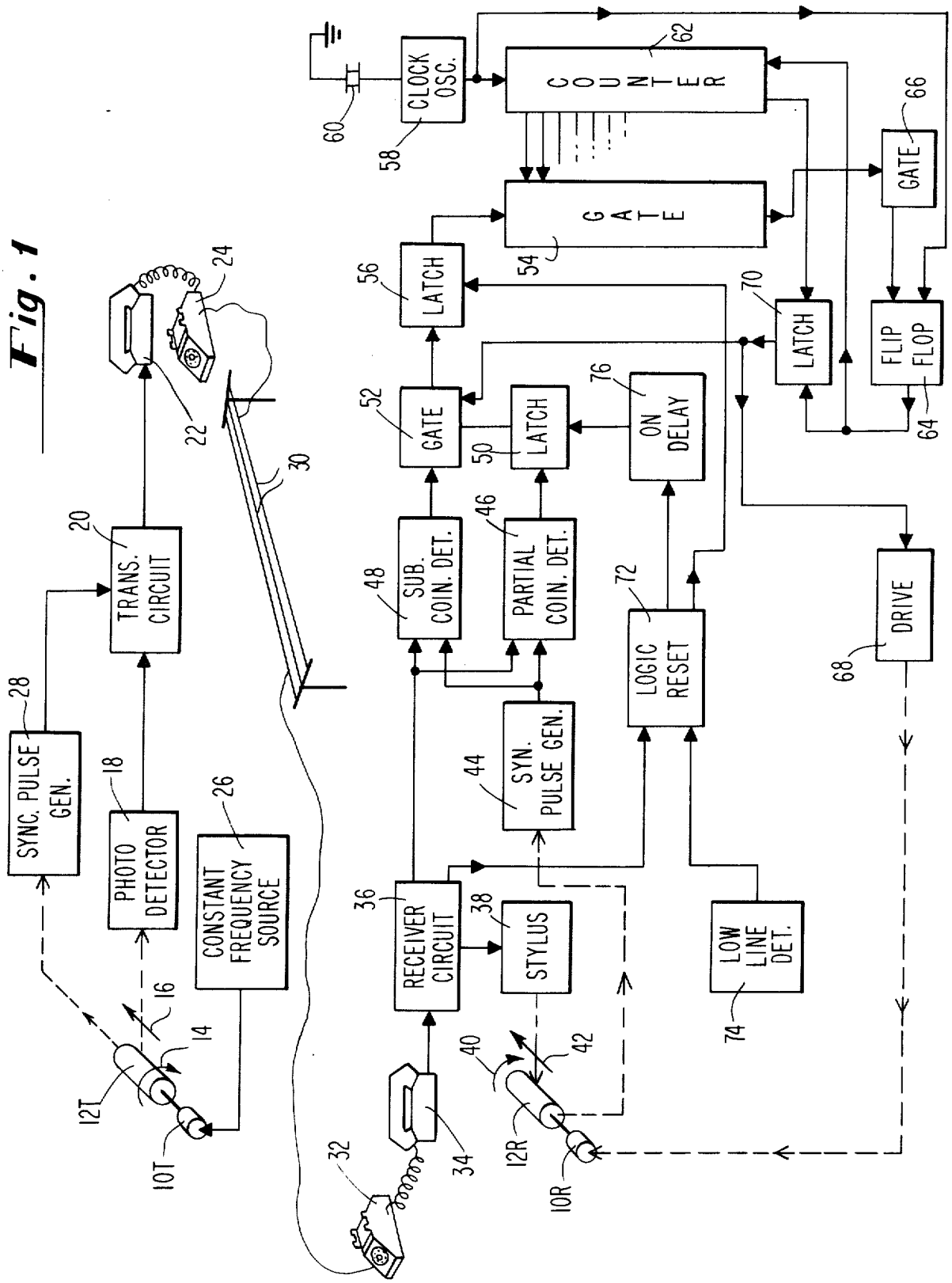
FIG. 1 is a block diagram of a facsimile system embodying the invention.

Referring now to the facsimile system shown in FIG. 1, a facsimile transmitter comprises a rotatably mounted drum 12T rotated through various angular positions by a synchronous motor 10T in the direction indicated by the arrow 14 so as to create a relative scanning movement between a document circumscribing the drum 12T and a scanning head not shown. As the scanning head is advanced axially along the drum 12T in the direction indicated by an arrow 16 and the drum rotates about its axis in the direction indicated by the arrow 14, successive paths on the document are illuminated and variations in light intensity due to the reflectivity and absorption of the document are detected by a photodetector 18 which is juxtaposed to the document. The output of the photodetector 18 is coupled to transmitter circuitry 20 which includes a suitable modulator such as a voltage controlled oscillator for creating frequency modulated signals which are applied to an acoustical coupler 22 which is associated with a conventional telephone handset 24.

The facsimile transmitter also includes means 26 for generating a drive signal for the synchronous motor 10T. In this particular embodiment of the invention, the means 216 comprises a source of a drive signal having a constant frequency so as to assure a fixed frequency of angular rotation for the drum 12T driven from the synchronous motor 10T.

The frequency of angular rotation of the drum 12T is sensed by a synchronizing pulse generator 28 via suitable means, e.g., optical or mechanical. The synchronizing pulses from the generator 28 are applied to the transmitter circuit 20 where they are transformed to frequency modulated signals for application to the acoustical coupler 22.

The frequency modulated signals representing the information content of the document mounted on the drum 12T and the synchronizing pulses from the generator 28 may be transmitted by suitable means such as conventional telephone lines 30 to a facsimile receiver which is coupled to another conventional telephone handset 32 in an associated acoustical coupler 34. A receiver circuit 36 of the receiver includes a preamplifier and demodulator having an output coupled to writing means such as a stylus 38 juxtaposed to a copy medium circumscribing a rotatably mounted drum 12R. The stylus 38 is driven in response to a stylus drive signal generated by the receiver circuit 36 so as to mark on the copy medium as the drum 12R is rotated through various angular positions by a synchronous motor 10R in a direction indicated by the arrow 40. The rotation of the drum 12R creates a scanning motion between a head not shown carrying the stylus 38 and a copy medium on the drum 12R. In addition, the head is moved axially along the drum so as to create an axial scanning motion as indicated by the arrow 42. As the drum 12R rotates, a synchronization pulse generator 44 in optical or mechanical communication with the drum 12R generates receiver synchronizing pulses indicating the angular position of the drum 12R.

In accordance with this invention, the rotation of the drum 12T at the transmitter and the drum 12R at the receiver are synchronized during the initial portion of a facsimile transmission by comparing the phase of the transmitter and receiver synchronizing pulses and varying the relative angular frequencies of rotation for the drum 12T and/or 12R accordingly until synchronization is achieved. As shown in the receiver circuitry of FIG. 1, the transmitter or external synchronizing pulses from the output of the receiver circuit 36 are compared in phase with the receiver synchronizing pulses produced at the output of the synchronizing pulse generator 44 by phase detector circuitry comprising a partial coincidence detector 46 and a substantial coincidence detector 48. As will be explained in somewhat more detail with reference to FIG. 2, the partial coincidence detector 46 detects coincidence or overlap in time between at least portions of the transmitter and receiver synchronizing pulses. When partial coincidence detection occurs, the detector 46 sets a latch 50 connected to a gate circuit 52 so as to indicate that the drums 12R and 12T are approaching synchronization. Subsequently, a more substantial predetermined degree of coincidence is detected by the detector 48 having an output connected to the gate 52 so as to indicate that the necessary or desired degree of synchronization between the drum 12R and the drum 12T has been achieved.

The detection of the phase relationship between the transmitter and synchronizing pulses, and more particularly, the detection of partial coincidence and substantial coincidence, is utilized to control the frequency of a motor drive signal in the following manner. As shown in FIG. 1, this control is achieved by selectively enabling gate circuitry 54 which is connected to a latch circuit 56 associated with the output of the gate 52. A clock oscillator 58 which generates high and substantially constant frequency pulses under the control of a crystal 60 is connected to a counter 62 comprising a series of binary counters. By applying control signals from the latch circuit 56 representing the degree of synchronization between the drums 12T and 12R, the gate circuitry 54 will be enabled in response to different counts stored in the counter 62. Each time the gate circuitry 54 is enabled, a flip-flop 64 is triggered by a gate 66 which is connected to the gate circuitry 54. This produces an output signal from the flip-flop 64 which serves to set the latch 70 and reset the counter 62. The pulse width of the latch 70 output is determined by a reset pulse from the counter 62. The output from the latch is applied to a drive circuit 68 which, in response to the state of coincidence and phase of receiver and transmitter synchronizing pulses, generates a suitable fixed frequency drive signal for the synchronous motor 10R. After the flip-flop 64 has been triggered or set by the output of gate 66, the next clock pulse from the clock oscillator 58 is applied to reset the flip-flop 64. The output from the flip-flop 64 is also applied to counter 62 to reset the various counter stages.

In accordance with this invention, the frequency of the motor drive signal applied to the synchronous motor 10R is substantially different from the frequency of the drive signal applied to the motor 10T at the time a facsimile transmission is initiated. In the preferred embodiment of FIG. 1, the frequency of the start-up drive signal from the drive circuit 68 is substantially different than the constant frequency of the drive signal from the constant frequency source signal 26 so as to permit the drums 12R and 12T to rapidly move toward angular sycnhronization. In order to achieve this frequency differential during initiation or start-up of the facsimile transmission, the counter 62 is allowed to accumulate a relatively large count before the gate circuitry 54 is enabled thus providing a low frequency drive to the motor 10R throughout a period in time where there is no coincidence in time between any portions of the transmitter and receiver drum synchronizing pulses.

As the transmitter and receiver drums move rapidly toward angular synchronization, partial coincidence is eventually detected between the receiver drum synchronizing pulses and the transmitter synchronizing pulses by the detector 46. At this time of partial coincidence, latches 50 and 56 are set so as to permit a predetermined count in the counter 62 to enable the gate circuitry 54 at a frequency equal to a desired drive frequency. This desired drive or creep frequency is substantially closer to the constant frequency of the source 26 than the start-up frequency but differs from the constant frequency so as to slowly permit the transmitter drum 12T and the receiver drum 12R to move toward a higher degree of angular synchronization. When the higher degree of angular synchronization is reached as determined by the coincidence detector 48, the latch 56 is set so as to enable the gate circuitry 54 each time another predetermined count in the counter 62 is accumulated. The predetermined count is chosen such that the gate circuitry 54 is enabled at a frequency equal to the constant frequency of the drive signal from the source 26.

In accordance with another aspect of this invention, the change in frequency for the drive 68 can only occur at axis crossing time. This is achieved by connecting the latch 70 to the gate circuit 52 so as to permit the gate circuit 52 to be enabled only at the axis crossing times.

By limiting the change in frequency to only axis crossing times, the previous half-cycle of the drive signal may be completed. Thus, the variable momentary loss of sync lock for the synchronous motor 10R is eliminated.

Once angular and speed synchronization between the drum 12T and the drum 12R has been achieved, the latch 56 remains set so as to enable the gate circuitry 54 at a frequency corresponding to the constant frequency of the source 26 until the latch 56 is reset. The resetting of the latch 56 may occur in response to a stop command applied to a locking reset generator 72. The latch 56 may also be reset in response to an indication of low power line voltage as determined by the low line detector 74.

The output of the logic reset generator 72 is also applied to an on-delay circuit 76 which is in turn coupled to the latch 50. The on-delay circuit 76 assures that the latch 50 will not be set before a predetermined period of time has elapsed at the time a transmission is initiated. This assures that the first or start-up frequency of the drive signal applied to the motor 10R has a sufficient duration to permit the motor to achieve sync lock with its driving frequency before a change in frequency occurs as a result of the latch 50 being set by the partial coincidence detector 46.

Certain aspects of the circuitry depicted in block form in FIG. 1 will now be described in detail with reference to FIG. 2. As shown there, the coincidence detector 46 comprises a NAND gate 80 having one input connected to the sync pulse generator 44 with another input connected to the receiver circuit 36 so as to detect the coincidence of the transmitter and receiver synchronizing pulses. After start-up and until partial coincidence of the synchronizing pulses is achieved, the output of the NAND gate is high at logic state 1.

The latch 50 comprises a pair of NAND gates 82 and 84 which are connected to the output of the NAND gate 80 and the output of the on-delay circuit 76. Assuming sufficient time has elapsed for the output on the on-delay circuit 76 to go high, the latch 50 at the output of the NAND gate 84 will go low to logic state 0 upon detection of partial coincidence between the receiver and transmitter synchronizing pulses.

The substantial coincidence detector 48 comprises an edge-triggered flip-flop register 86 having data and clock terminals connected to the receiver circuit 36 and the sync generator 44 respectively. Flip-flop 86 detects substantial coincidence by determining a reversal in the lead-lag relationship between the leading edges of the transmitter and receiver drum synchronizing pulses during the time of partial pulse coincidence. The lead-lag relationship between these synchronizing pulses determines the state of the flip-flop 86 output. When a reversal in the lead-lag relationship occurs, the flip-flop 86 output reverses at the leading edge of the receiver drum synchronizing pulse.

The gate circuit 52 connected to the detector 46 comprises a first NAND gate 88 having one input coupled to the output of the NAND gate 84 of the latch 50 and another input receiving a function control signal which is high when the transceiver is in the receive mode. The output of the NAND gate 88 serves as an enable signal and is connected to a pair of NAND gates 90 and 92 in the gate circuit 52. Other inputs of the NAND gates 90 and 92 are connected to the outputs of the flip-flop 86 and the latch 70.

When the latch 50 is set so that the output from the NAND gate 84 goes low, the NAND gate 88 enables gates 90 and 92 at axis crossing time. The state of the flip-flop 86 will now determine which latch 94 or 96 is set.

When the receiver synchronizing pulses generated by rotation of the receiver drum lead the transmitter synchronizing pulses after the detection of partial coincidence by the detector 46, the output of the flip-flop 86 connected to an input of the NAND gate 92 is high so as to enable the NAND gate 92 at axis crossing time while the output of the flip-flop 86 connected to an input of the NAND gate 90 is low so as to inhibit the NAND gate 90. When the receiver drum synchronizing pulses lag the transmitter synchronizing pulses after detection of partial coincidence by the detector 46, the output of the flip-flop 86 connected to the input of the NAND gate 92 is low so as to inhibit the NAND gate 92 while the output of the flip-flop 86 connected to the input of the NAND gate 90 goes high so as to enable the NAND gate 90 at axis crossing time.

The latch circuitry 56 which is connected to the gate circuit 52 comprises a pair of latches 94 and 96 comprising NAND gates 98 and 100 and NAND gates 102 and 104 respectively. When the NAND gate 92 is enabled, indicating that the leading edge of the receiver drum synchronizing pulse leads the leading edge of the transmitter synchronizing pulse, the latch 96 is set and remains set even when the leading edge of the transmitter and receiver synchronizing pulses undergo a reversal in the lead-lag relationship. The latch 94 is set when the gate 90 is enabled which occurs when the leading edge of the receiver drum synchronizing pulses trail the leading edge of the transmitter synchronizing pulses. The setting of the latches 94 or 96 will occur at axis crossing time immediately after partial coincidence detection by the detector 46. After a reversal in the lead-lag relationship of the leading edges on the transmitter and receiver synchronizing pulses, the latch 94 or 96 not previously set will be set so that both latches 94 and 96 are set with gate 100 and 104 outputs low.

Gate circuit 54 comprises a plurality of NAND gates 106, 108, 110 and 112 which are selectively enabled by the latches 94 and 96 and the count stored or accumulated count in the counter 62 which comprises a series of four divide-by-sixteen counters 114, 116, 118 and 120. In addition, the gate circuit 54 comprises a pair of NOR gates 122 and 124 which are coupled to the latches 94 and 96. When one of the NAND gates 106–112 is enabled, NAND gate 126 of the gate circuit 66 enables the flip-flop 64 which is set by the next clock pulse from the clock oscillator 58 and then reset by the following clock pulse. Thus the flip-flop 64 produces a short duration reset pulse equal to one clock cycle which is fed to each of the counters 114–120 in the counter 62 so as to set the count to zero.

The latch 70 comprises a pair of NOR gates 128 and 130 having inputs connected to the flip-flop 64 and the counter 116 which controls the duration of pulses produced at the output of the NOR gates 128 and 130 where the frequency of the pulses is proportional to, e.g., twice, the drive frequency for the motor 10R. The pulses at the output of the NOR gate 130 are applied to the driver 68 while the pulses at the output of the NOR gate 128 are applied to NAND gates 90 and 92 to assure that any change in frequency of the drive signal occurs at axis crossing time for the drive signal.

Referring to the waveforms of FIG. 3, the operation of the circuit shown in FIG. 2 will be described. Waveform A depicts transmitter (external) synchronizing pulses which are applied to the partial coincidence detector 46 and the substantial coincidence detector 48. As shown, the transmitter synchronizing pulses represented by the high state 1 have a substantially constant frequency representing the synchronous or operating frequency while scanning the document. Waveform B depicts receiver drum (local) synchronizing pulses which are applied to the partial coincidence detector 46 and the substantial coincidence detector 48. Note that the receiver synchronizing pulses in waveform B have a lesser frequency than the transmitter synchronizing pulses in waveform A. The first two receiver synchronizing pulses have a frequency substantially less than the frequency of the transmitter synchronizing pulses indicating a receiver drum rotationl speed less than the transmitter drum speed. The second two receiver synchronizing pulses have a frequency approaching the frequency of the transmitter synchronizing pulses but slightly less than that frequency. It is this difference in frequency between the transmitter synchronizing pulses and the receiver drum synchronizing pulses which permits the receiver drum and the transmitter drum to move toward and reach angular synchronization rapidly at first and then more slowly after partial coincidence between the transmitter and receiver pulses are detected.

When the transmitter synchronizing pulse and the receiver synchronizing pulse have the relationship which is depicted in waveforms A and B, the latches 94 and 96 of the latch circuitry 56 begin in the reset condition, i.e., gate 100 and 104 output are high. During this time, the receiver synchronizing pulses and the transmitter synchronizing pulses are rapidly approaching coincidence due to the substantial frequency differential, and, at time $t_1$, partial coincidence occurs between the transmitter synchronizing pulses of waveform A and the receiver drum synchronizing pulses of waveform B. At this moment of first partial coincidence, the latch 50 is set and the output of the NAND gate 84 goes low.

Since the receiver drum synchronizing pulses at time $t_1$ are leading the transmitter synchronizing pulses, the substantial coincidence detector 48 is set so that gate 92 is enabled at axis crossing time and gate 90 is inhibited. This in turn sets latch 96 at the next axis crossing inhibit period as shown in waveform C while latch 94 remains in the reset condition as shown in waveform D. To simplify this explanation it is assumed the crossing inhibit pulse from the gate 130 is low and the enabling pulse from the gate 128 is high at the time of sync pulse coincidence. Latch 94 remains in the reset condition until time $t_2$ when a reversal in the lead-lag relationship between the leading edge of the receiver drum synchronizing pulse occurs at a time when the transmitter synchronizing pulse is high thus reversing the state of the flip-flop 86 which in turn enables NAND gate 90 and at axis crossing time sets latch 94.

After the latch 96 is set at time $t_1$, NAND gate 110 is enabled while the NAND gates 106 and 108 are inhibited. When the count of the counter 62 corresponds to a creep frequency slightly less than the synchronous frequency of the transmitter synchronizing pulses of waveform A, all inputs of NAND gate 110 are high thus producing a low at the output of gate 110 which signals the end of a half cycle period. Prior to time $t_1$, NAND gate 112 was enabled with all inputs high at a count corresponding to an initial or start-up frequency substantially less than the synchronous frequency of the transmitter synchronizing pulses of waveform A so as to permit the transmitter and receiver drum synchronizing pulses to rapidly approach coincidence. At time $t_2$, and with the setting of the latch 94, NAND gate 108 is enabled while NAND gate 106 is inhibited at a count corresponding to a receiver drum synchronizing pulse frequency substantially equal to the frequency of the transmitter synchronizing pulses.

From the foregoing, it should be clear that the setting of the latch 96 prior to the setting of the latch 94 was a function of the lead-lag relationship or relative positions of the transmitter and receiver drum synchronizing pulses at the time partial coincidence was detected. If the receiver synchronizing pulses have a somewhat different position in time as depicted in wave form E with respect to the transmitter synchronizing pulses depicted in waveform A, the order in which the latches 94 and 96 are set will differ as will the frequency of the drive signal applied to the motor. In waveform E, partial coincidence with the transmitter synchronizing pulses occurs at time $t_1'$ when the receiver drum synchronizing pulse leading edge occurs at a time when the transmitter synchronizing pulse is high. As a result, the NAND gate 90 by way of flip-flop 86 is enabled at axis crossing time while the NAND gate 92 is inhibited so as to set the latch 94 as shown in waveform G while the latch 96 remains in the reset condition at time $t_1'$ as shown in waveform F. The setting of the latch 94 at time $t_1'$ enables NAND gate 106 at a clock pulse count in the counter 62 corresponding to a creep frequency slightly greater than the frequency of the transmitter synchronizing pulses. This frequency differential allows the receiver drum synchronizing pulses of waveform E to creep slowly toward the condition of substantial coincidence with the transmitter synchronizing pulses of waveform A. At time $t_2'$, the reversal of the lead-lag relationship between the leading edge of the receiver drum synchronizing pulse and the leading edge of the transmitter synchronizing pulse is detected. At this time, the latch 96 is set as shown in waveform F. The setting of the latch 96 enables the NAND gate 108 while inhibiting the NAND gate 106 at a count corresponding to a receiver drum synchronizing pulse frequency substantially equal to the frequency of the transmitter synchronizing pulses.

From the foregoing, it should be clear that the receiver drum motor drive signal frequency control is particularly advantageous since it allows an unsynchronized transmitter drum and receiver drum to move rapidly toward synchronization while at the same time avoiding overshoot and permitting the achievement of a high degree of synchronization. To accomplish this goal, the first or start-up frequency of the receiver motor drive signal should differ substantially from the frequency of the transmitter motor drive signal. Preferably, the difference in frequency exceeds five percent which has been found sufficient to enable the transmitter and receiver drums to move rapidly toward synchronization. Where the frequency of the motor drive signal for the transmitter is 60 Hz., a receiver drive signal of 52.587 Hz. has been found to be particularly suitable. Once partial coincidence occurs, the receiver motor is driven by a signal which has been designated as having a creep frequency. Preferably, the frequency differential between the transmitter drive signal frequency and the creep frequency of the receiver drive signal is less than one percent of the transmitter drive signal frequency. Where a 60 Hz. transmitter drive signal frequency is utilized, a drive signal creep frequency of 60.328 Hz., where the receiver drum synchronizing pulses trail the transmitter synchronizing pulses, and 59.866 Hz., where the receiver drum synchronizing pulses lead the transmitter synchronizing pulses have been found suitable.

Since the transmitter drum and receiver drum are moving very slowly toward synchronization, due to the very small frequency differential between the creep frequency and the synchronous frequency, it is possible to detect a reversal in the lead-lag relationship of the synchronizing pulses after that reversal has occurred without substantially overshooting the desired degree of angular synchronization. This reversal in the lead-lag relationship may be conveniently determined by applying the transmitter synchronizing pulses to the data input of the flip-flop 86 as shown in FIG. 2 while strobing the clock input with the leading edge of the receiver drum synchronizing pulses. If the lead-lag relationship between the leading edges of the transmitter and the receiver synchronizing pulses reverses, the state of the flip-flop 86 will reverse simultaneously with the strobing by the leading edge of the receiver drum synchronizing pulse.

Figure 2:
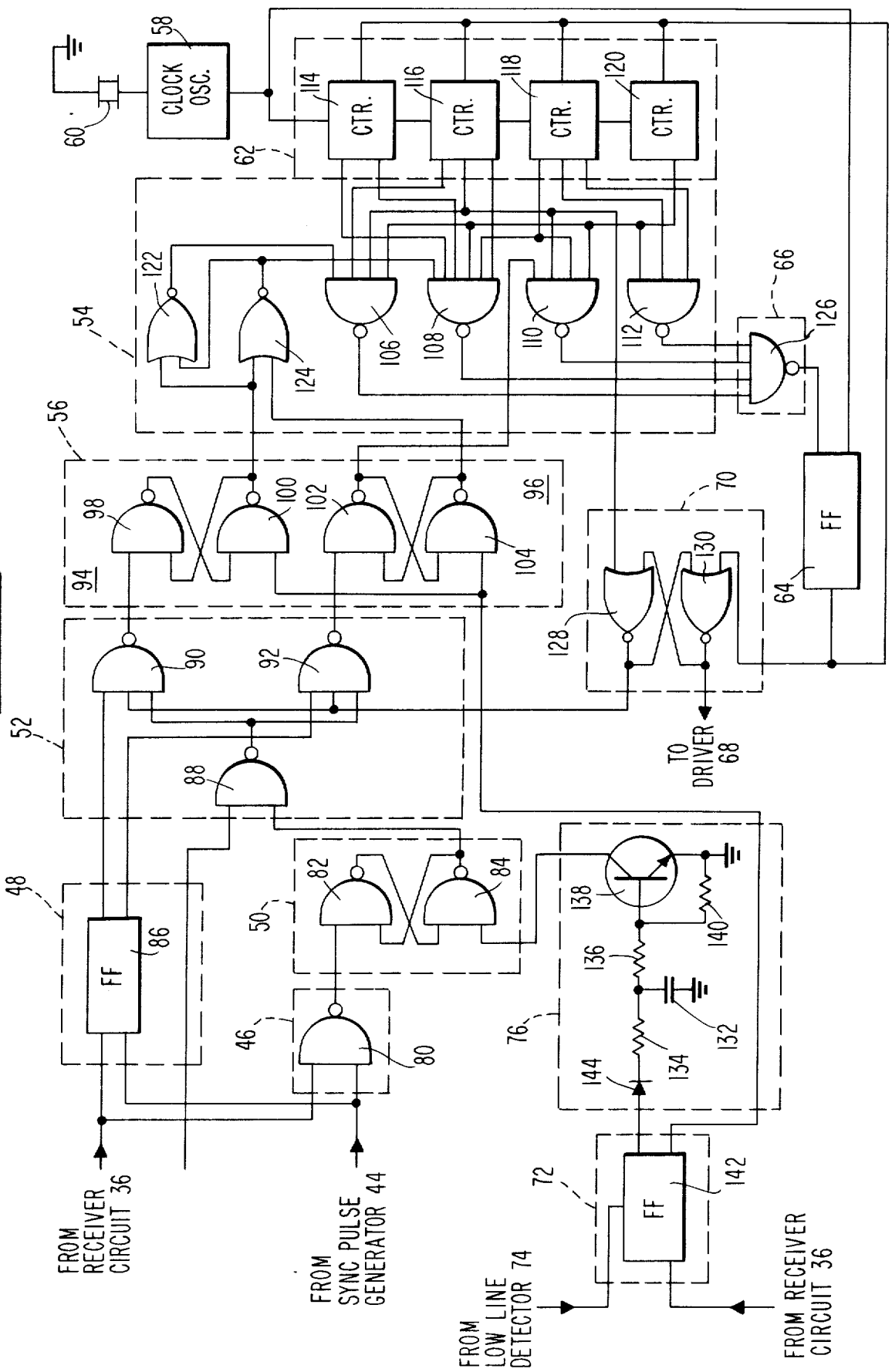
FIG. 2 is a schematic circuit diagram of portions of the block diagram shown in FIG. 1.

As shown in FIG. 2, the counter 62 may comprise divide-by-sixteen counters 114, 116, 118 and 120. In order to achieve AC drive signal frequencies of 52.787 Hz., 59.866 Hz. and 60.328 Hz., assuming a clock oscillator frequency of 2 MHz., the NAND gates 106, 108, 110 and 112 should be connected to the following counter outputs:

NAND 112 (52.787 Hz.)
    512 of counter 118
    2048 of counter 118
    16384 of counter 120
NAND 106 (60.328 Hz.)
    64 of counter 116
    128 of counter 116
    16384 of counter 120
NAND 108 (60 Hz.)
    2 of counter 114
    8 of counter 114
    16 of counter 116
    256 of counter 118
    16384 of counter 120
NAND 110 (59.866 Hz.)
    64 of counter 116
    256 of counter 118
    16384 of counter 120

In order for phase detection and frequency control provided by the circuit of FIG. 2 to function properly, it is necessary to reset the logic circuit, a function which is provided by the logic reset generator 72 in conjunction with the on-delay circuit 76. As mentioned previously, the on-delay circuit 76 functions to prevent a change in frequency before the motor 10R has come into sync with the first or start-up drive signal frequency, e.g., 52.787 Hz. This function is provided by RC circuitry within the time circuit 76 comprising a capacitor 132 connected between ground and the junction of a pair of resistors 134 and 136 in the base circuit of a transistor 138 having the base and emitter terminals interconnected by another resistor 140. When the output of a flip-flop 142 in the reset generator 72 which is connected to a diode 144 goes from high to low, the charge accumulated on the capacitor 132 does not decay immediately. This permits the motor 10R shown in FIG. 1 to achieve sync with the 52.787 Hz. signal before the latch 50 connected to the collector of the transistor 138 can be set which only occurs at first sync pulse coincidence if the capacitor 132 has been discharged and the transistor 138 becomes non-conductive. The other output of the flip-flop 142 is applied directly to the latches 94 and 96 without any time delay. The control signals for setting the flip-flop 142 are received from the receiver circuit 36 but may be inhibited by an indication from the detector 74 that the power line voltage for the machine is below a predetermined level necessary to assure proper functioning of the logic circuitry.

The output from the latch 70 and the drive 68 is a pulse train having a frequency determined by the relative phase relationships between the transmitter and receiver synchronizing pulses. For example, when the NAND gate 108 is enabled, the counter 62 will be permitted to accumulate a count of 16,666 clock pulses which produces a train of pulses at gate 108 output having a spacing of 8333 microseconds and a frequency of 120 Hz. This train of pulses may readily be converted into a 60 Hz. square wave AC signal for driving the motor 10R. One particularly desirable way of utilizing the 120 Hz. pulse train to drive the motor 10R is shown in copending application Ser. No. 493,118, filed July 30, 1974 which is assigned to the assignee of this invention. The pulse train generated by the circuit shown in FIG. 2 may be utilized in other ways to create a suitable AC drive signal for the motor 10R. For example, a low pass filter can produce a sine wave which can be amplified to the necessary power and voltage level to drive the motor 10R.

In accordance with one very important aspect of the invention, a frequency of the drive signal may only be changed at axis crossing time, i.e., simultaneously with the pulse generated at the output of the latch 70 so as to permit the motor to maintain sync with the drive signal. This is accomplished by connecting an output from the latch 70 to the gates 90 and 92. This prevents the partial coincidence detector 46 or the substantial coincidence detector 48 from enabling the NAND gates 90 and 92 until axis crossing time.

In the foregoing, a transmitter and a receiver have been shown. It will of course be appreciated that the transmitter and receiver circuitry and the reading and writing means may be combined in a single facsimile transceiver unit. Since the photodetector 18 and the stylus 38 may not be juxtaposed to the same angular position on the drum of the unit, it may be necessary to in effect provide two sync pulse generators. A first sync pulse generator would generate a sync pulse corresponding to juxtaposition between a predetermined angular position on the drum and the optical pickup means or photodetector. The other sync pulse generator would generate a delayed sync pulse which would correspond to juxtaposition between the writing means or stylus 38 and the same predetermined angular position on the drum. When the unit is utilized as a transmitter, the first sync pulse would be utilized for synchronization purposes. When the unit is utilized as a receiver, the delayed sync pulse is utilized for synchronization. By adjusting the delay of the delayed sync pulses, the margin of the copy medium may be adjusted.

The clock oscillator 58 and the crystal 60 have been utilized so as to render the facsimile unit substantially independent of variations in power line frequency. It is of course well known that a crystal oscillator provides a substantially constant frequency and is therefore desirable for use where variations in frequency cannot be tolerated. However, it is possible to substitute the crystal 60 and the clock oscillator 58 for another source of high frequency timing signals. It is also possible to provide margin sync and still use the power line frequency as the reference frequency for drum speed control.

The NAND gate 80 of the partial coincidence detector 46 has been illustrated as a particularly simple and convenient means for detecting partial coincidence between the transmitter and receiver drum synchronizing pulses. It will of course be understood that other means may be utilized to detect partial coincidence. Similarly, the flip-flop 86 is a particularly convenient and simple means for detecting substantial coincidence of the transmitter and receiver synchronizing pulses. It is particularly adaptable for use where a creep frequency is utilized to improve the synchronization between the transmitter and receiver drums. However, it will be understood that other means for detecting substantial coincidence between the transmitter and receiver drum synchronizing pulses may be utilized to control the switching from the creep frequency to the desired synchronous frequency.

In the embodiments of FIGS. 1 and 2, the frequency of the transmitter drum motor drive signal remains substantially constant while the frequency of the receiver drum motor drive signal varies until angular synchronization between the drums is achieved. It will of course be appreciated that the frequency of the receiver drum motor drive signal may remain substantially constant while the frequency of the transmitter drum motor drive signal varies in accordance with principles of this invention. It is also possible for both the transmitter and receiver drum motor drive signals to vary simultaneously in accordance with the principles of this invention until drum synchronization is achieved.

It is also possible to change the frequency of the receiver and transmitter drive signals before synchronization has been achieved. This permits the use of high frequency drive signals while moving toward synchronization so as to achieve synchronization more rapidly. The frequency of the drive signals may then be reduced simultaneously so that the motors are rotated at the proper speed for scanning purposes.

The invention has been described in terms of synchronizing a facsimile. Of course, the principles of this invention are equally applicable to the synchronization of the systems.

Although a preferred embodiment of the invention has been shown and described and various modifications are suggested, it will be understood that other embodiments and modifications which would occur to those of ordinary skill in the art fall within the true spirit and scope of the invention as set forth in the appended claims.

I claim:

1. A method of achieving synchronization in a facsimile system comprising a receiver having a rotatably driven drum for receiving a copy medium and information writing means juxtaposed to various angular positions of the receiver drum as the drum is rotated, a transmitter having a rotatably driven drum for receiving a document and information sensing means juxtaposed to various angular positions on the transmitter drum as the transmitter drum is rotated, and a communications link carrying signals between the transmitter and the receiver, the method comprising the following steps:
- rotatably driving one drum at a first angular frequency and another drum at a second angular frequency, the first angular frequency and the second angular frequency having a first frequency differential;
- generating first synchronizing pulses corresponding to a predetermined angular position of one transmitter drum;
- generating second synchronizing pulses corresponding to a predetermined angular position of the other drum;
- first detecting a degree of coincidence in time between said first synchronizing pulses and at least a portion of said second synchronizing pulses;
- rotatably driving said other drum at a third angular frequency in response to the first coincidence detection, the differential between said third angular frequency and said first angular frequency being substantially less than the differential between said second angular frequency and said first angular frequency;
- subsequently detecting a more substantial degree of coincidence in time than first detected between said first synchronizing pulses and said second synchronizing pulses; and
- rotatably driving said other drum at said first angular frequency in response to the subsequent detection.

2. The method of claim 1 further comprising detection of the relative lead-lag relationship between said first synchronizing pulses and said second synchronizing pulses at the time of the first coincidence detection, said third frequency being selected in response to the determination of said lead-lag relationship such that said third frequency is greater than said first frequency when said first synchronizing pulses lead said second synchronizing pulses, said third frequency being less than said first frequency when said first synchronizing pulses lag said second synchronizing pulses.

3. The method of claim 1 wherein the more substantial degree of coincidence detection comprises detection of a reversal of the lead-lag relationship between one edge of said first synchronizing pulses and one edge of said second synchronizing pulses.

4. The method of claim 3 wherein the more substantial degree of coincidence detection comprises detection of the reversal of the lead-lag relationship between the leading edges of said first and said second synchronizing pulses.

5. The method of claim 3 further comprising detection of the relative lead-lag relationship between the first synchronizing pulses and the second synchronizing pulses at the time of the first coincidence detection, the third frequency being selected in response to the determination of the lead-lag relationship such that the third frequency is greater than the first frequency when the first synchronizing pulses lead the second synchronizing pulses, the third frequency being less than the first frequency when the first synchronizing pulses lag the second synchronizing pulses.

6. The method of claim 1 wherein the frequency differential between the first frequency and the second frequency is greater than five percent of the first frequency.

7. The method of claim 1 wherein the frequency differential between the first frequency and the third frequency is less than one percent of the first frequency.

8. In a facsimile unit comprising a rotatably mounted drum, a synchronous motor for rotatably driving the drum, information transducer means juxtaposed to and scanning the drum during rotation through various angular positions, and detector circuitry for generating external synchronizing pulses by demodulating externally generated synchronizing signals, the improvement comprising synchronization circuitry including:
- pulse generating means for generating local synchronizing pulses corresponding to a predetermined angular position of the drum;
- motor drive means for generating motor drive signals characterized by discrete frequencies at different times, the motor drive signal being characterized by a first frequency substantially different from a synchronous frequency and a creep frequency the differential between the synchronous frequency and the first frequency being greater than the differential between the creep frequency and the synchronous frequency;
- phase detector means coupled to the pulse generation means and the detector circuitry for detecting different degrees of coincidence in time between local synchronizing pulses and external synchronizing pulses; and
- motor drive control means coupled to the phase detector means and the motor drive means for changing the frequency of the motor drive signal from the first frequency to the creep frequency in response to the detection of partial coincidence, said motor drive control means also changing the frequency of the motor drive signal from the creep frequency to the synchronous frequency in response to the detection of a more substantial degree of coincidence than said first partial coincidence.

9. The facsimile unit of claim 8 wherein the phase detector means comprises means for detecting a reversal in the lead-lag relationship between the local synchronizing pulses and the external synchronizing pulses, the reversal representing said more substantial degree of coincidence.

10. The facsimile unit of claim 9 wherein said means for detecting a reversal in the lead-lag relationship comprises means for detecting a reversal in the lead-lag relationship of the leading edges of the local and external synchronizing pulses.

11. The facsimile unit of claim 10 wherein said means for detecting a reversal in the lead-lag relationship comprises a flip-flop.

12. The facsimile unit of claim 11 wherein said phase detector further comprises gate means for detecting said partial coincidence.

13. The facsimile unit of claim 10 wherein said motor drive means comprises:
- clock means for generating clock pulses at a clock frequency;
- counter means coupled to said clock means for accumulating a count representing the number of said clock pulses applied to said counter means;
- gate means coupled to said counter means and said phase detector means, said gate means being enabled as a function of the detected phase relationship between the local and external synchronizing pulses and the count accumulated in said counter means.

14. A facsimile unit comprising a rotatably mounted drum, a synchronous motor for rotatably driving the drum, information transducer means juxtaposed to various angular positions of the receiver drum as the drum is rotated, and detector circuitry for demodulating external synchronizing signals, the improvement comprising synchronizing circuitry in said unit including:

- means for generating local synchronizing signals corresponding to juxtaposition between said transducer means and a predetermined angular position on said drum;
- clock means for generating clock pulses at a clock frequency;
- counter means coupled to said clock means for accumulating a count representing the number of clock pulses applied to said counter means;
- detector means for detecting the phase relationship between the local synchronizing signals and the external synchronizing signals;
- gate means coupled to said detector means and said counter means, said gate means changing state as a function of the detected phase relationship and the count stored in said counter means; and
- drive means coupled to said gate means for generating a motor drive signal having a frequency proportional to the frequency at which said gate means changes state, said motor drive signal being coupled to said synchronous motor.

15. The facsimile unit of claim 14 wherein said detector means comprises;

- means for detecting partial coincidence in time between said external synchronizing signals and said local synchronizing signals; and
- means for detecting a predetermined, more substantial degree of coincidence in time between said first synchronizing signals and said second synchronizing signals than said partial coincidence;
- said means for detecting partial coincidence enabling said gate means so as to change the frequency of said motor drive signal from a first frequency to a creep frequency approaching a synchronous frequency, said substantial coincidence detection means enabling said gate means so as to chance the drive signal frequency from said creep frequency to said synchronous frequence.

16. The facsimile unit of claim 14 wherein said external synchronizing signals comprise pulses and said local synchronizing signals comprise pulses.

17. The facsimile unit of claim 16 wherein said substantial coincidence detection means comprises means for detecting a reversal in the lead-lag relationship between an edge of said external synchronizing pulses and an edge of said local synchronizing pulses.

18. The facsimile unit of claim 17 wherein said detector means comprises additional gate means coupled to said gate means, said additional gate means only changing state in response to a change in state of said gate means so as to prevent a change in frequency until an axis crossing of said motor drive signal.

19. A circuit for synchronizing the operation of a local unit with externally generated synchronizing pulses comprising:

- pulse generating means for generating local synchronizing signals representing the state of the unit;
- drive means for generating drive signals having different and discrete drive frequencies at different times, said discrete frequencies including a first frequency different from a synchronous frequency and a creep frequency different from said synchronous frequency, the differential between said creep frequency and said synchronous frequency being less than the differential between said first frequency and said synchronous frequency;
- phase detector means coupled to the pulse generation means for detecting partial coincidence and a more substantial coincidence than partial coincidence between the external synchronizing pulses and the local synchronizing pulses; and
- drive control means coupled to the phase detector and the drive means, said drive control means changing the frequency of the motor drive signal in response to the detection of partial coincidence and more substantial coincidence, said motor drive signal having said first frequency before partial coincidence detection, said creep frequency after partial coincidence detection and before more substantial coincidence detection and said synchronous frequency after more substantial coincidence detection.

20. A method of achieving synchronization in a facsimile system comprising a receiver including writing means juxtaposed to a copy medium and receiver scanning means for creating a relative scanning motion between said writing means and said copy medium, a transmitter including information sensing means juxtaposed to a document and transmitter scanning means for creating a relative scanning motion between said sensing means and said document, and a communications link carrying signals between the transmitter and the receiver, the method comprising the following steps:

- creating said relative scanning motion at said receiver at a first scanning rate and creating said relative scanning motion at said transmitter at a second scanning rate, the first scanning rate and the second scanning rate having a substantial scanning differential;
- generating a first synchronizing signal corresponding to a predetermined position of said writing means with respect to said copy medium;
- generating a second synchronizing signal corresponding to a predetermined position of said reading means with respect to said document;
- first detecting a degree of coincidence in time between said first synchronizing signal and at least a portion of said second synchronizing signal;
- reducing the differential between the first scanning rate and the second scanning rate in response to the first coincidence detection;
- subsequently detecting a more substantial degree of coincidence in time than first detected between said first synchronizing signal and said second synchronizing signal; and
- substantially eliminating the scanning rate differential in response to the subsequent detection.

21. The method of claim 20 further comprising the following steps:

- detecting the relative lead-lag relationship between said first synchronizing signal and said second synchronizing signal; and
- controlling the differential between the first and second scanning rates in response to said lead-lag detection such that the first scanning rate is larger than the second scanning rate in response to one lead-lag relationship and the second scanning rate is larger than the first scanning rate in response to the opposite lead-lag relationship.

22. The method of claim 20 wherein the more substantial degree of coincidence detection comprises detection of a reversal of the lead-lag relationship between one edge of the first synchronizing signal and one edge of the second synchronizing signal.

23. The method of claim 22 wherein the more substantial degree of coincidence detection comprises detection of the reversal of the lead-lag relationship between the leading edges of the first and the second synchronizing signals.

24. The method of claim 20 wherein said first synchronizing signal comprises a series of first synchronizing pulses and said second signal comprises a series of second synchronizing pulses.

25. The method of claim 24 further comprising the following steps:
   detecting the relative lead-lag relationship between said first synchronizing pulses and said second synchronizing pulses; and
   controlling the differential between the first and second scanning rates in response to said lead-lag detection such that the first scanning rate is larger than the second scanning rate in response to one lead-lag relationship and the second scanning rate is larger than said first scanning rate in response to the opposite lead-lag relationship.

26. The method of claim 25 wherein the more substantial degree of coincidence detection comprises detection of a reversal of the lead-lag relationship between one edge of said first synchronizing pulses and one edge of said second synchronizing pulses.

27. The method of claim 20 wherein the substantial scanning rate differential exceeds 5 percent of the first scanning rate.

28. The method of claim 27 wherein the reduced scanning rate differential is less than 1 percent of the first scanning rate.

29. A facsimile unit comprising information transducer means juxtaposed to a document and/or a copy medium, scanning means for creating relative scanning motion between said information transducer means and said document and/or said copy medium, and detector circuitry for generating external synchronizing signals by demodulating externally generated synchronizing signals, the improvement comprising synchronization circuitry including:
   local signal generating means for generating local synchronizing signals corresponding to a predetermined scanning position;
   scanning drive means for generating an initial scanning rate, a creep scanning rate, and a synchronous scanning rate for said scanning means;
   phase detector means coupled to the synchronizing signal generating means and the detector circuitry for detecting different degrees of coincidence in time between the local synchronizing signals and the external synchronizing signals; and
   scanning drive control means coupled to the phase detector means and the scanning drive means for changing from the initial scanning rate to the creep scanning rate in response to the detection of partial coincidence, said scanning drive control means also changing from said creep scanning rate to said synchronous scanning rate in response to the detection of a more substantial degree of coincidence.

30. The facsimile unit of claim 29 wherein the phase detector means comprises means for detecting a reversal in the lead-lag relationship between the local synchronizing signals and the external synchronizing signals, said reversal representing said more substantial degree of coincidence.

31. The facsimile unit of claim 29 wherein said external synchronizing signals comprises a series of external synchronizing pulses and said local synchronizing signals comprises a series of local synchronizing pulses.

32. The facsimile unit of claim 31 wherein said means for detecting a reversal in the lead-lag relationship comprises means for detecting a reversal in the lead-lag relationship with the leading edges of the local and external synchronizing pulses.

33. The facsimile unit of claim 32 wherein said means for detecting a reversal in the lead-lag relationship comprises a flip-flop.

34. The facsimile unit of claim 33 wherein said phase detector further comprises gate means for detecting said partial coincidence.

35. The facsimile unit of claim 29 wherein said externally generated synchronizing signals comprise a series of external synchronizing pulses and said local synchronizing signals comprise a series of local synchronizing pulses, said unit further comprising:
   clock means for generating clock pulses of a clock frequency;
   counter means coupled to said clock means for accumulating a count representing the number of said clock pulses applied to said counter means; and
   gate means coupled to said counter means and said phase detector means, said gate means being enabled as a function of the detected phase relationship between the local and external synchronizing pulses and the count accumulated in said counter means.

36. A facsimile unit comprising scanning means, scanning drive means, information transducer means adapted to move relative to said scanning means to various scanning positions, a detector circuitry for demodulating external synchronizing signals, the improvement comprising synchronizing circuitry in said unit including:
   means for generating local synchronizing signals corresponding to juxtaposition between said transducer means and a predetermined scanning position;
   clock means for generating clock pulses at a clock frequency;
   counter means coupled to said clock means for accumulating a count representing the number of clock pulses applied to said counter means;
   detector means for detecting the phase relationship between said local synchronizing signals and the external synchronizing signals;
   gate means coupled to said detector means and said counter means, said gate means changing state as a function of the detected phase relationship and the count stored in said counter means; and
   drive means coupled to said gate means for generating a scanning drive signal having a frequency proportional to the frequency at which said gate means changes state, said drive signal being coupled to said scanning drive means.

37. The facsimile unit of claim 36 wherein said scanning drive means comprises a motor.

38. The facsimile unit of claim 37 wherein said scanning means comprises a rotatably mounted drum.

39. The facsimile unit of claim 36 wherein said detector means comprises:

means for detecting partial coincidence in time between said external synchronizing signals and said local synchronizing signals, said partial coincidence corresponding to approximate synchronization of said unit; and means for detecting a predetermined, more substantial degree of coincidence in time between said first synchronizing signals and said second synchronizing signals;

said means for detecting partial coincidence enabling said gate means so as to change the frequency of said scanning drive signal from a first frequency to a creep frequency approaching a synchronous frequency, said substantial coincidence detection means enabling said gate means so as to change the frequency of said scanning drive signal from said creep frequency to said synchronous frequency.

40. The facsimile unit of claim 36 wherein said external synchronizing signals comprise pulses and said local synchronizing signals comprise pulses.

41. The facsimile unit of claim 40 wherein said substantial coincidence detection comprises means for detecting a reversal in the lead-lag relationship between an edge of said external synchronizing pulses and an edge of said local synchronizing pulses.

42. The facsimile unit of claim 36 wherein said scanning drive signal comprises a plurality of axis crossings and said detector means comprises additional gate means coupled to said gate means, said additional gate means only changing state in response to a change of state of said gate means so as to prevent a change in frequency until an axis crossing of said scanning drive signal.

* * * * *